(12) United States Patent
Fulghum

(10) Patent No.: US 7,609,754 B2
(45) Date of Patent: Oct. 27, 2009

(54) METHOD AND APPARATUS FOR RECEIVED COMMUNICATION SIGNAL PROCESSING

(75) Inventor: Tracy L. Fulghum, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 586 days.

(21) Appl. No.: 11/215,638

(22) Filed: Aug. 30, 2005

(65) Prior Publication Data
US 2007/0047629 A1 Mar. 1, 2007

(51) Int. Cl.
*H04B 1/00* (2006.01)
(52) U.S. Cl. ...................................... 375/148
(58) Field of Classification Search ................. 375/148, 375/150, 259, 340, 343, 345; 370/500
See application file for complete search history.

(56) References Cited

U.S. PATENT DOCUMENTS

| | | | |
|---|---|---|---|
| 6,069,912 A | 5/2000 | Sawahashi et al. | |
| 6,108,375 A | 8/2000 | Farrokh et al. | |
| 6,154,503 A | 11/2000 | Strolle | |
| 6,363,104 B1 | 3/2002 | Bottomley et al. | |
| 6,430,214 B1 | 8/2002 | Jalloul et al. | |
| 6,452,917 B1 * | 9/2002 | Leung | 370/342 |
| 6,570,909 B1 | 5/2003 | Kansakoski et al. | |
| 6,671,268 B2 | 12/2003 | Leung | |
| 7,133,688 B2 * | 11/2006 | Das et al. | 455/522 |
| 7,236,514 B2 * | 6/2007 | Bottomley et al. | 375/147 |
| 7,269,205 B2 * | 9/2007 | Wang | 375/148 |
| 7,486,716 B2 * | 2/2009 | Fulghum et al. | 375/150 |
| 2002/0051485 A1 | 5/2002 | Bottomley et al. | |
| 2002/0080863 A1 | 6/2002 | Nielsen | |
| 2002/0141505 A1 | 10/2002 | Lundby | |
| 2003/0031278 A1 | 2/2003 | Kang et al. | |

(Continued)

FOREIGN PATENT DOCUMENTS

EP   0 639 915 A1   2/1995

(Continued)

OTHER PUBLICATIONS

Zhu, Jie et al., "Channel Estimation with Power-Controlled Pilot Symbols and Decision-Directed Reference Symbols"; 2003; 5 pages; Fayetteville, Arkansas, USA.

(Continued)

*Primary Examiner*—Khanh C Tran
(74) *Attorney, Agent, or Firm*—Coats & Bennett, P.L.L.C.

(57) ABSTRACT

A method of processing a received communication signal comprises calculating a traffic-to-pilot scaling factor by relating data correlations determined from despread traffic values obtained from the received communication signal-to-noise correlations determined from despread pilot values obtained from the received communication signal, and generating traffic symbol estimates by combining corresponding ones of the despread traffic values using combining weights calculated from the data correlations. Generating combining weights in this manner provides, among other things, Minimum Mean Square Error (MMSE) estimations for the received traffic symbols that inherently are properly scaled in amplitude relative to symbol values in a reference modulation constellation. By obtaining proper scaling as part of combining weight generation, the receiver need not make an explicit estimate of symbol power to obtain proper soft value information, and the estimated traffic symbols may be compared directly with the reference constellation.

21 Claims, 2 Drawing Sheets

U.S. PATENT DOCUMENTS

| | | | |
|---|---|---|---|
| 2003/0067968 | A1 | 4/2003 | Papasakellariou et al. |
| 2003/0092447 | A1 | 5/2003 | Bottomley et al. |
| 2003/0133520 | A1 | 7/2003 | Jayaraman et al. |
| 2003/0156563 | A1 | 8/2003 | Papasakellariou et al. |
| 2004/0048619 | A1 | 3/2004 | Kim et al. |
| 2004/0066773 | A1 | 4/2004 | Sun et al. |
| 2004/0096015 | A1 | 5/2004 | Ishii et al. |
| 2004/0264589 | A1 | 12/2004 | Kenney et al. |
| 2004/0264590 | A1 | 12/2004 | Kenney et al. |
| 2004/0264591 | A1 | 12/2004 | Malm et al. |
| 2005/0002478 | A1 | 1/2005 | Agami et al. |
| 2005/0069023 | A1 | 3/2005 | Bottomley et al. |
| 2005/0111528 | A1 | 5/2005 | Fulghum et al. |
| 2005/0163199 | A1 | 7/2005 | Wang |
| 2005/0201447 | A1 | 9/2005 | Cairns et al. |
| 2006/0003784 | A1* | 1/2006 | Chion et al. ............. 455/518 |
| 2006/0018367 | A1* | 1/2006 | Bui ..................... 375/148 |

FOREIGN PATENT DOCUMENTS

| | | |
|---|---|---|
| EP | 1 191 713 A1 | 3/2002 |
| EP | 1 422 896 A1 | 5/2004 |

OTHER PUBLICATIONS

Lee, Jungwoo, "Log Likelihood Ratio Calculation Without SNR Estimation for Forward Line DS-CDMA Receivers"; IEE Signal Processing Letters; Jun. 2004; 4 pages; vol. 11 No. 6.

Wong, Kainam Thomas et. al. "A Self-Decorrelating" Technique to Enhance Blind Space-Time RAKE Receivers with Single-User-Type DS-CDMA Detector; 2001; 5 pages.

Schramm, Peter, "Analysis and Optimization of Pilot-Channel-Assisted BPSK for DS-CDMA Systems"; IEE Transactions on Communications; Sep. 1998; 3 pages; vol. 46, No. 9.

Shin, Simon et. al., "CDMA200 1X Performance Comparison with Pilot Power Ratio"; 2002 International Zurich Seminar on Broadband Communications; Feb. 19-21, 2002; 6 pages.

Sung, Younchul et. al., "Blind Channel Tracking for Long-Code WCDMA With Linear Interpolation Model"; 2002; 5 pages.

Zesong, Fei et. al., "Improved Binary Turbo Coded Modulation with 16QAM in HSDPA"; 2003; 4 pages.

Zheng, Kan et. al., "Analysis and Optimization of Pilot-Symbol-Assisted MC-CDMA Systems"; WCNC-IEE Communications Society; 2004; 5 pages.

Signaling of CPICH and DSCH power ratio for M-ary demodulation, AH24: High Speed Downlink Packet Transmission; TSG-RAN Working Group Meeting #16; Pusan, Korea, Sep. 10-13, 2000; 2 pages.

UE complexity for AMCS; AH24: High Speed Downlink Packet Transmission; TSG-RAN Working Group Meeting #18, Boston, MA; Jan. 15-18, 2001; 6 pages.

Choi, BJ et. al., "Rake Receiver Detection of Adaptive Modulation Aided CDMA over Frequency Selective Channels"; In Proceedings of VTC 2001 (Fall), Atlantic City; 5 pages.

Parkvall, et. al., Evolving WCDMA for Improved High Speed Mobile Internet; Proc. Future Telecommunications Conference 2001, Beijing, China, Nov. 28-30, 2001; 5 pages.

Wang et. al., "Generalized RAKE Reception for Canceling Interference from Multiple Base Stations"; Proc. IEE Vehicular Technology Conference, Boston; Sept. 24-28, 2000; 7 pages.

Bottomley, G. et. al., "A Generalized RAKE Receiver for Interference Suppression"; IEE Journal on Selected Areas in Communications, vol. 18, No. 8, Aug. 2000; 10 pages.

A Method for Blind Determination of Pilot to Data Power Ration for QAM Signals, TSG-RAN Working Group 1, Meeting # 21, Aug. 2001.

Codenie, J. et. al., "Implementation Of A Digital Amplitude Detector Based on the Cordic Transform"; 1997; 4 pages.

Efstathiou, Dimitrios et.al., "Preamble-Less Nondecision-Aided (NDA) Feedforward Synchronization Techniques for 16-QAM TDMA Demodulator"; IEE Transactions on Vehicular Technology; May 1998; 13 pp.; vol. 47 No. 2.

Huang, Yuheng et. al., "Joint Iterative Estimation and Decoding for 16-QAM BICM over Correlated Fading Channels"; Nov. 2002; 5 pages.

Huang, Yueng et. al., "Joint interative estimation and decoding for 16-QAM over correlated fading channels"; yuhengabstract.htm; 2004; 2 pages.

Hai et. al., "Approaches for fast, adaptive, generalized rake reception"; Research Disclosure Journal; Kenneth Mason Publications; Research Disclosure Database No. 475041; Nov. 2003.

* cited by examiner

METHOD AND APPARATUS FOR RECEIVED COMMUNICATION SIGNAL PROCESSING

BACKGROUND OF THE INVENTION

The present invention relates to wireless communication receivers, and particularly relates to demodulating amplitude-modulated signals.

Higher-order modulation constellations represent one mechanism supporting the faster data rates of current and evolving wireless communication systems. For a given symbol rate, more bits in each modulation symbol translates into higher effective data rates, assuming acceptable demodulation performance at the receiver. The High Speed Downlink Packet Access (HSDPA) extension of the WCDMA standards supports higher-level modulation in its higher data rate modulation/coding schemes. For example, the High Speed Downlink Shared Channel (HS-DSCH) uses 16-QAM in one or more of its modulation/coding schemes.

Use of 16 QAM on the HS-DSCH enables higher data rates, but such use complicates data reception. Specifically, an amplitude reference is required at the conventional receiver to detect received symbols and properly scale the soft information for decoding (e.g., by a turbo decoder). For HS-DSCH, and for CDMA-based pilot-and-traffic-channel transmissions in general, the needed amplitude reference represents the relative scaling between the code channel used for estimation (e.g., the pilot channel) and the code channel(s) being demodulated (e.g., the traffic channels).

The needed scale factor g can be written as $$h_{traf} = g h_{pil} \qquad \text{Eq. 1}$$

where $h_{pil}$ represents the channel response vector as estimated from the received pilot channel signal, $h_{traf}$ represents the channel response vector for the traffic channel, which is unknown, and g is the scale factor. To illustrate the usefulness of the scale factor, consider the Log-Likelihood Ratio (LLR) for bit $b_j$ of the ideal QAM demodulator, which is given as $$LLR(b_j) = \frac{\sum_{s_i \in S_0(j)} \exp\left\{\gamma\left(2\text{Re}\left(\frac{s_i^* z}{w^H h_{traf}}\right) - |s_i|^2\right)\right\}}{\sum_{s_i \in S_1(j)} \exp\left\{\gamma\left(2\text{Re}\left(\frac{s_i^* z}{w^H h_{traf}}\right) - |s_i|^2\right)\right\}} \qquad \text{Eq. 2}$$

where z is the symbol estimate made by the receiver, $s_i$ is a candidate symbol from a normalized scale constellation, $\gamma$ is the signal-to-noise ratio (SNR), which actually may be calculated as a signal-to-interference-plus-noise ratio (SINR), and w represents a vector of combining weights used to form the estimated symbol z.

With incorporation of the proper scaling and assuming a log-max turbo decoder and the use of the pilot channel for estimating channel coefficients, the log-likelihood ratio becomes $$LLR(b_j) = \gamma\left[\max_{s_i \in S_0(j)}\left(2\text{Re}\left(\frac{s_i^* z}{\mu}\right) - |s_i|^2\right) - \max_{s_i \in S_1(j)}\left(2\text{Re}\left(\frac{s_i^* z}{\mu}\right) - |s_i|^2\right)\right], \qquad \text{Eq. 3}$$

where the normalization factor $\mu$ is defined as $$\mu = w^H h_{traf} \qquad \text{Eq. 4}$$

The normalization factor is used to normalize the symbol estimate z for comparison to the symbols $s_i$ in a normalized scale modulation constellation. The scale factor commonly is determined as an explicit, additional step, through time estimation of the RMS value of the estimated symbol, $$\sqrt{\langle|z|^2\rangle} \approx w^H h_{traf} = \mu. \qquad \text{Eq. 5}$$

The above estimation represents an explicit computational step that is carried out by the conventional receiver after generation of the estimated symbols z.

In addition to the explicit pilot-to-traffic scaling needed for the symbol estimates, use of the pilot channel in other aspects of receiver operation can be problematic. For example, conventional Generalized RAKE (G-RAKE) receiver processing generates the combining weights w a function of received signal impairment correlations. Considering impairment correlations in the combining weight generation process allows the G-RAKE receiver to cancel colored (correlated) interference across its RAKE fingers, leading to reduced interference in the estimated symbols z.

As a baseline approach, G-RAKE receivers estimate noise correlations for a received communication signal using despread pilot values. Commonly, the impairment correlations are assumed to have zero mean and, as such, they are expressed in terms of a noise correlation matrix determined from the pilot symbols despread from the received communication signal.

Regardless of such details, however, using pilot symbols constrains the number of despread values available for estimating the impairment correlations over any given reception interval. As an example, the Wideband Code Division Multiple Access (W-CDMA) standards provide for Transmission Time Intervals (TTIs) of varying "slot" counts. Generally, one Common Pilot Channel (CPICH) symbol is transmitted per slot. Thus, for the three-slot TTI associated with the High Speed Downlink Shared Channel (HS-DSCH) used in W-CDMA networks to provide high-rate packet data services, relatively few pilot symbols are available for noise correlation estimation per TTI.

The relatively small number of pilot symbols available for correlation estimation can lead to poor noise correlation estimates. Averaging the noise correlation estimations under such circumstances can lead to reduced estimation error, but such smoothing compromises the receiver's ability to respond to fast fading conditions.

SUMMARY OF THE INVENTION

In one embodiment of signal processing as taught herein, a method of processing a received communication signal comprises calculating a traffic-to-pilot scaling factor by relating data correlations determined from despread traffic symbols from the RAKE fingers (despread traffic values) obtained from the received communication signal to noise correlations determined from despread pilot values obtained from the received communication signal. The traffic symbol estimates are generated by combining corresponding despread traffic values from the RAKE fingers using combining weights calculated from the data correlations.

Generating combining weights in this manner provides, among other things, Minimum Mean Square Error (MMSE) estimations for the received traffic symbols that inherently are properly scaled in amplitude relative to symbol values in a reference modulation constellation. This inherent scaling of the traffic symbol estimates eliminates the need for estimating the (average) power of the symbol estimates before constellation comparison, which would otherwise be required for establishing the proper amplitude reference in QAM demodulation, for example.

Among the further advantages of this combining weight generation method is the ability to track changing impairment correlations under fast fading conditions, owing to the relatively large number of traffic samples available for data correlation estimation. For example, the multi-coded data transmissions used for HS-DSCH in W-CDMA networks provides up to 12 channelization codes for data transmission, which, at a spreading factor of 16, yields 1920 data points per transmission slot. With that number of per-slot data points available, intervals within the slot may be defined for data correlation estimation, such that multiple data correlation estimations are made within a given slot, and these estimations can be averaged over the slot, if desired, or used on a per-interval basis, i.e., used on a "localized" basis for each interval within the slot.

In another embodiment, a receiver circuit may be implemented in a wireless communication device that is configured for operation in a wireless communication network. The receiver circuit comprises one or more correlation circuits configured to determine data correlations for despread traffic values obtained from the received communication signal and noise correlations for despread pilot values obtained from the received communication signal, a scaling factor calculation circuit configured to calculate one or more traffic-to-pilot scaling factors by expressing the noise correlations as a function of the data correlations, and a combining weight circuit configured to calculate combining weights for combining the despread traffic values as a function of the one or more traffic-to-pilot scaling factors, the data correlations, and channel estimates determined from the despread pilot values.

At least the correlation circuits, scaling factor circuit, and combining weight circuit may comprise a Generalized RAKE (G-RAKE) receiver circuit, which may be implemented as discrete functional elements, or be implemented together in an integrated processor, such as a microprocessor, DSP, ASIC, etc. Regardless, the receiver circuit may further include, or be associated with, a channel estimation circuit configured to generate the channel estimates, a combining circuit configured to generate traffic symbol estimates by using the combining weights to combine corresponding ones of the despread traffic values, a signal quality calculation circuit configured to calculate a signal-to-noise ratio for the received communication signal as a function of the combining weights, the channel estimates, and one or more of the one or more traffic-to-pilot scaling factors, and a demodulation circuit configured to generate first soft-valued bit estimates for each traffic symbol estimate by comparing the traffic symbol estimate to traffic symbols in a reference symbol constellation.

Because the traffic symbol estimates are generated from combining weights based on the data correlations, they are inherently scaled for comparison to traffic symbols in the reference symbol constellation, i.e., the MMSE combining weight solution inherently drives the traffic symbol estimation process toward the correct reference amplitude. As such, the first soft-valued bit estimates may be thought of as representing "short-term" soft information within the slot. To obtain final soft information for proper decoding, the demodulation circuit may be configured to scale the first soft-valued bit estimates by the signal-to-noise ratio and thereby obtain second soft-valued bit estimates suitable for decoding.

Broadly, then, various embodiments of the present invention provide a G-RAKE receiver apparatus and method that, by using despread traffic data for data correlation estimation and a model fitting parameter calculation, give a combining weight solution that provides an already properly scaled traffic symbol estimate, $z'$. Such operation eliminates the need in the QAM demodulation process to estimate the average power of the symbol estimate and normalize it before comparison to the normalized constellation. Further, the parameters obtained in the model fitting parameter calculation are used to determine the SNR, $\gamma$, needed for properly scaled soft information in the Log Likelihood Ratio (LLR) calculations used in symbol detection (demodulation).

Of course, the present invention is not limited by the above features and advantages. Indeed, those skilled in the art will appreciate additional features and advantages upon reading the following detailed description, and upon viewing the accompanying drawings.

DETAILED DESCRIPTION OF THE INVENTION

Figure 1:
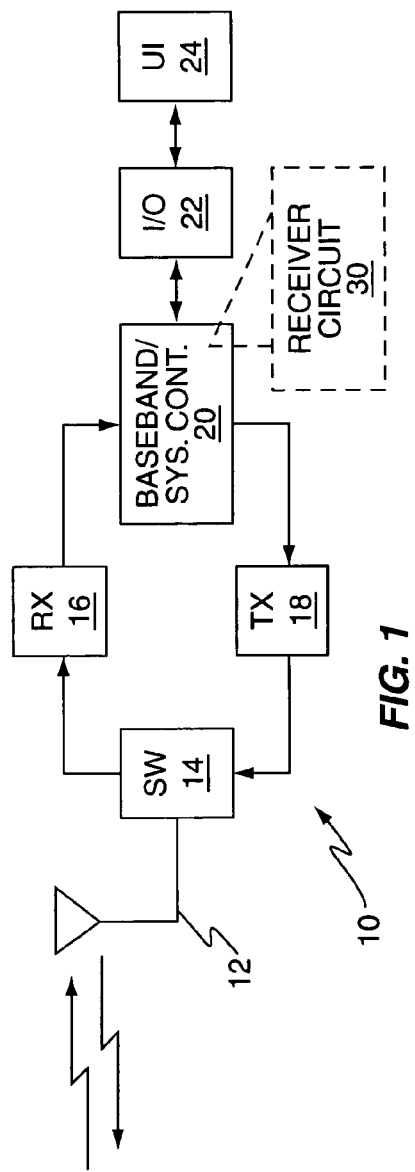
FIG. 1 is a block diagram of one embodiment of a wireless communication device, which may be configured to carry out received signal processing as taught herein.

FIG. 1 is a block diagram of a wireless communication device 10, such as a radiotelephone, or other type of mobile terminal, for use in a wireless communication network. By way of non-limiting example, the device 10 may comprise a mobile terminal configured for use in a W-CDMA network, or in some other type of CDMA network.

The illustrated embodiment of the device 10 comprises a receive/transmit antenna 12, a switch and/or duplexer 14, a receiver 16, a transmitter 18, a baseband/system controller 20, input/output circuits 22, and a user interface 24. The baseband/system controller 20, which may comprise one or more processing circuits, such as microprocessors, DSPs, ASICs, FPGAs, etc., provides baseband processing of the received communication signal, which may be output by the receiver 16 as baseband digital samples obtained from a filtered and down-converted version of the antenna-received communication signal. For CDMA-based communication systems, the received communication signal represents a composite of code-multiplexed signals transmitted on the same carrier frequency. Thus, the received communication signal commonly includes one or more traffic signals carrying data of interest, and one or more pilot channels that may be used to determine channel estimates, etc.

Figure 2:
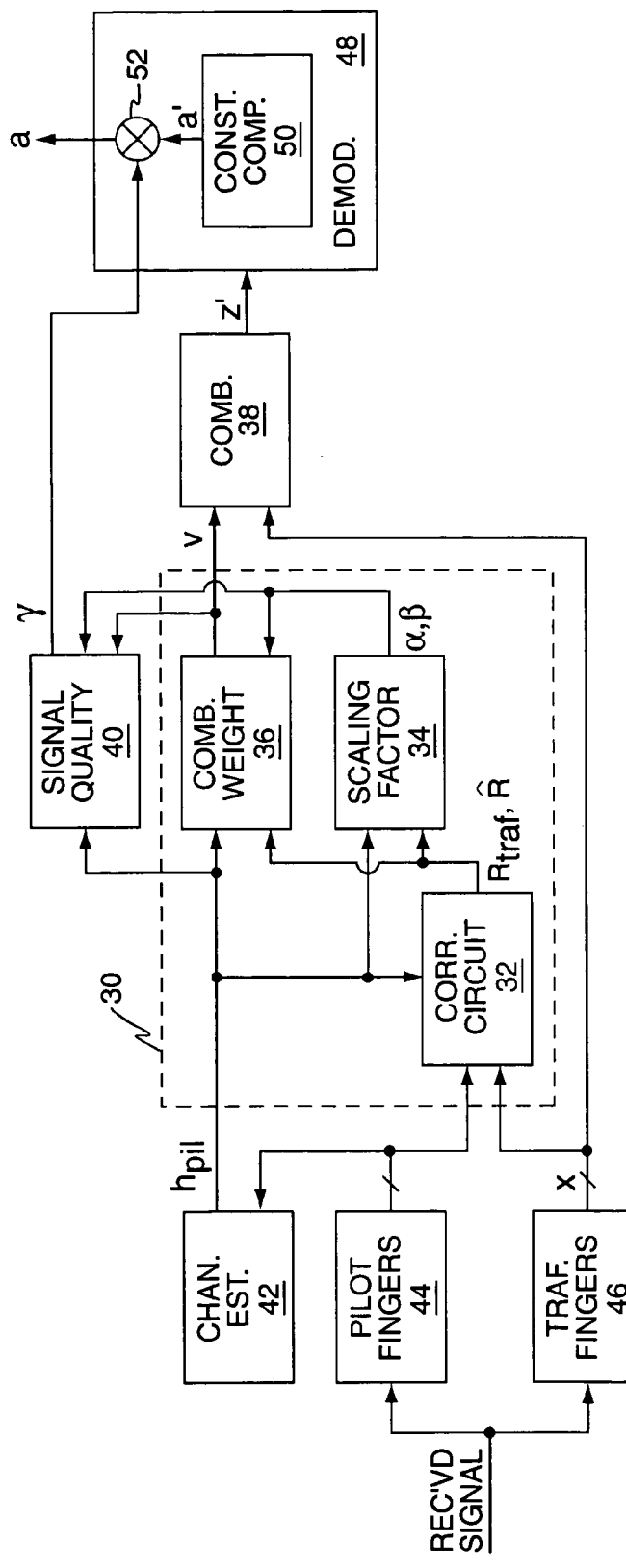
FIG. 2 is a block diagram of one embodiment of a receiver circuit that may be implemented in the device of FIG. 1 for carrying out at least a portion of the signal processing taught herein.

Of particular interest to the discussion herein, the baseband/system controller 20 includes a receiver circuit 30 that provides for the estimation of received traffic symbols based on combining despread traffic values obtained from the received communication signal according to combining weights generated from data correlations, rather than from (pilot) noise correlations. FIG. 2 illustrates one embodiment of the receiver circuit 30.

In the illustrated embodiment, the receiver circuit 30 at least includes one or more correlation circuits 32, a scaling factor calculation circuit 34, and a combining weight circuit 36. The correlation circuits 32 are configured to determine data correlations for despread traffic values obtained from the received communication signal and noise correlations for despread pilot values obtained from the received communication signal. In turn, the scaling factor calculation circuit 34 is configured to calculate one or more traffic-to-pilot scaling factors by expressing the noise correlations as a function of the data correlations, and the combining weight circuit 36 is configured to calculate combining weights for combining the despread traffic values as a function of the one or more traffic-to-pilot scaling factors, the data correlations, and channel estimates determined from the despread pilot values.

Functionally, the receiver circuit 30 may operate as a G-RAKE receiver circuit, and may further include, or be associated with, a combining circuit 38, a signal quality estimation circuit 40, a channel estimation circuit 42, pilot fingers (correlators) 44, and traffic fingers (correlators) 46. More particularly, the receiver circuit 30 may be configured to operate as a non-parametric G-RAKE receiver circuit, wherein it generates traffic symbol estimates z' from the received communication signal based on combining weights determined from measured data correlations. The traffic symbol estimates may be output for further processing, such as by a demodulator circuit 48. Notably, as will be detailed below, the traffic symbol estimates z' are inherently scaled in amplitude for symbol detection, thus obviating the need for an explicit amplitude scaling step before comparing the symbol estimates to a reference constellation.

Figure 3:
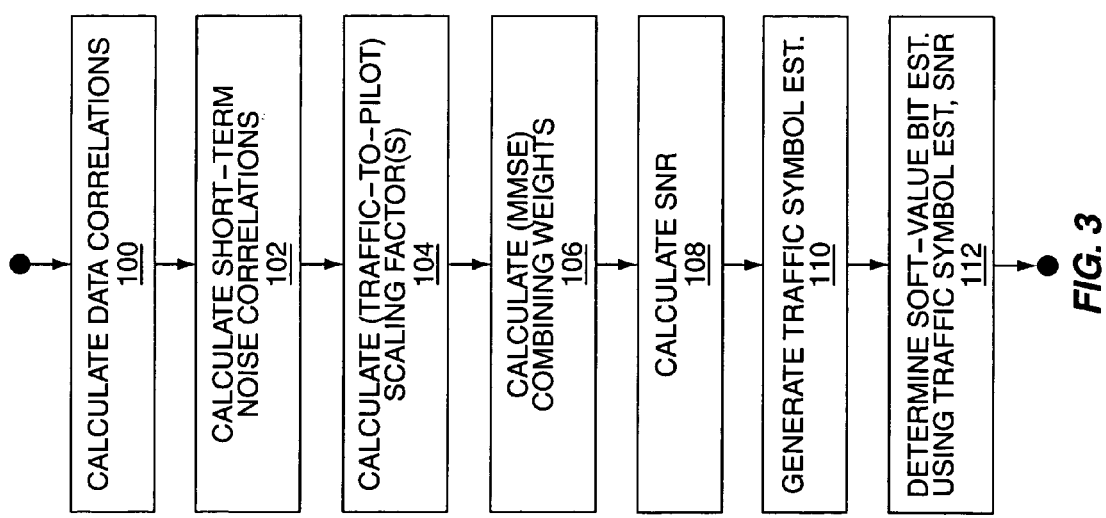
FIG. 3 is a logic flow diagram processing logic representing one embodiment of estimating traffic symbols based on determining data correlations from despread traffic values.

FIG. 3 illustrates an embodiment of processing logic for operating the receiver circuit 30, and its supporting or related circuits. First, the correlation circuit(s) 32 determine data correlations from the despread traffic values obtained from the received communication signal by the traffic fingers 46 (Step 100). Assuming zero mean, the data correlations may be expressed as a covariance matrix $R_{traf}$, which can be calculated as $$R_{traf} = \frac{1}{M_{sym}K} \sum_{i=0}^{M_{sym}-1} \sum_{k=0}^{K-1} x_{i,k} x_{i,k}^H \quad \text{Eq. 6}$$

where $x_{i,k}$ is the vector of finger despread values from each RAKE finger for the traffic data for the $i^{th}$ symbol in the slot of the $k^{th}$ channelization code (or user)—i.e., the vector of despread traffic values taken across the outputs from the traffic fingers 46. The number of traffic symbols received in the slot for a channelization code is $M_{sym}$ and the number of channelization codes is K.

Processing continues with calculating a short-term estimate of the noise correlations (a "snapshot") from the despread pilot values obtained from the received communication signal by the pilot fingers 44 (Step 102). Assuming zero mean, the noise correlations may be expressed as a covariance matrix $\hat{R}$, which can be calculated as $$\hat{R} = \frac{1}{M_{pil}-1} \sum_{i=0}^{M_{pil}-1} u_i u_i^H \quad \text{Eq. 7}$$

where $u_i$ is the vector of disturbance values estimated on the $i^{th}$ despread pilot symbol taken over the pilot fingers 44, and where the use of $M_{pil}-1$ adjusts for a statistical bias in the estimate.

Then, to obtain the MMSE combining weight v, the receiver circuit 30 may be configured to solve the system of equations represented by $$h_{traf} = R_{traf} v \quad \text{Eq. 8}$$

where the correlation matrix $R_{traf}$ is formed as shown in Eq. 6 by estimating the correlation between the despread traffic symbol values output by the traffic fingers 46.

Generally, the receiver circuit 30 will not have a vector of channel coefficients estimated with respect to the traffic channel at its disposal, but rather will have channel estimates derived from the pilot channel, $h_{pil}$. These channel estimates are related to the vector of traffic channel coefficients by $$h_{traf} = g h_{pil} \quad \text{Eq. 9}$$

where g represents a scaling difference between the traffic and pilot channels. The scaling factor g may be defined as the ratio of the energy per symbol of the traffic and the pilot, and, for more detailed information, one may refer to the co-pending U.S. application assigned Ser. No. 10/672,492, entitled "Method and Apparatus for Signal Demodulation," which was filed on 26 Sep. 2003 and is incorporated by reference herein.

In any case, processing continues with calculating one or more traffic-to-pilot scaling factors, accounting for differences in the traffic and pilot channels (Step 104). These factors, which may be denoted as $\alpha$ and $\beta$, can be determined by expressing the noise correlations (the snapshot) as a function of the data correlations, such as, $$\hat{R} \approx \beta R_{traf} - \alpha h_{pil} h_{pil}^H \quad \text{Eq. 10}$$

where $h_{pil}$ are the channel estimates determined from the despread pilot values. The receiver circuit 30 can be configured to perform a Least Squares (LS) fitting of Eq. 10 to determine values for $\alpha$ and $\beta$. However, those skilled in the art will appreciate that other methods may be used to determine $\alpha$ and $\beta$ from Eq. 10. In one embodiment, $\beta$ may be assumed to equal unity, and the Eq. 10 can easily be solved for $\alpha$, where it may be noted that $\alpha$ can be expressed as $$\alpha = g^2 \quad \text{Eq. 11}$$

Processing continues with calculating a MMSE combining weight solution for combining the despread traffic values (Step 106). The MMSE combining weights v may be expressed as $$v = R_{traf}^{-1} h_{traf} = \sqrt{\alpha} R_{traf}^{-1} h_{pil} \quad \text{Eq. 12}$$

The receiver circuit 30 can be configured to calculate a signal quality for the received communication signal (Step 108). In one embodiment, the signal quality calculation circuit 40 is configured to calculate a Signal-to-Noise Ratio (SNR) for the traffic channel as $$\gamma = \left( \frac{\sqrt{\alpha} \, v^H h_{pil}}{\beta - \sqrt{\alpha} \, v^H h_{pil}} \right) \quad \text{Eq. 13}$$

In another embodiment, a de-emphasis factor $0 \leq \lambda \leq 1$ can be used to reduce the effects of noisy v and $h_{pil}$, giving the SNR calculation as $$\gamma = \left( \frac{\sqrt{\alpha} \, v^H h_{pil}}{\beta - \sqrt{\alpha} \, \lambda v^H h_{pil}} \right) \quad \text{Eq. 14}$$

Further, a hard limit can be placed on the denominator terms, so that $\beta > 0$ and $\beta - \alpha \lambda v^H h_{pil} > 0$, ensuring a finite, positive SNR measurement. Of course, those skilled in the art will appreciate that other formulations for SNR may be used as needed or desired.

Processing continues with calculating traffic symbol estimates based on the combining weights determined from Eq. 12 (Step 110). The combiner circuit 38 may be configured to generate estimated traffic symbols as $$z' = v^H x \quad \text{Eq. 15}$$

Notably, assuming that the traffic symbols being estimated are QAM symbols or some other type of amplitude-modulated symbols, the formulation of the traffic symbol estimates according to the above method allows the receiver circuit 30 to eliminate the need for estimating the power of the traffic symbol estimates before the constellation comparison in QAM demodulation. That is, use of the data correlations according to Eq. 12 in traffic symbol estimation according to Eq. 15 inherently yields traffic symbol estimates that are properly scaled for comparison to traffic symbols in a reference modulation constellation. Thus, the traffic symbol estimates obtained from Step 110 above may be used directly in symbol constellation comparison, and the SNR then can be used to scale to final soft bit values.

In more detail, according to one embodiment of demodulation taught herein, a constellation comparison circuit 50 of the demodulation circuit 48 is configured to generate first soft-valued bit estimates for each traffic symbol estimate by comparing the traffic symbol estimate z' to traffic symbols in a reference symbol constellation (Step 112). The demodulation circuit 48 further is configured to generate second soft-valued bit estimates for each traffic symbol estimate by scaling the corresponding first soft-valued bit estimates by the signal-to-noise ratio γ, such as by using the illustrated scaling circuit 52, which receives the γ value from the receiver circuit 30. These second soft-valued bits are thus adjusted for the longer-term variations in received signal quality, representing the LLR of the bits being demodulated to be used, for example, for decoding.

Mathematically, the first soft-valued bits may be generated (Step 112) by the constellation comparison circuit 50 using Euclidean distance comparison, which can be expressed as $$a'_j = \max_{s_i \in S_0(j)} (2\mathrm{Re}(s_i^* z') - |s_i|^2) - \max_{s_i \in S_1(j)} (2\mathrm{Re}(s_i^* z') - |s_i|^2) \quad \text{Eq. 1}$$

where $s_i$ represents the $i^{th}$ nominal symbol value in the reference constellation. In particular, $s_i \in D_0(j)$ represents all symbol values in the reference modulation constellation where the $j^{th}$ bit is zero, and $s_i \in S_1(j)$ represents all symbol values in the reference modulation constellation where the $j^{th}$ bit is one. Thus, the short-term soft information yielded by Eq. 1 represents the difference between the distance of z' to the closest (reference) symbol with $b_j=0$ and the distance of z' to the closest (reference) symbol with $b_j=1$.

The short-term soft information can be combined with the long-term soft information carried by the SNR to give the complete soft information as $$a_j = \gamma a'_j = LLR(b_j) \quad \text{Eq. 17}$$

The soft-valued bits $a_j$ may be used for decoding to recover the transmitted traffic data carried in the received communication signal.

Independent of such decoding details, however, it should be noted that the use of data correlations offers additional significant advantages over and above the inherent amplitude scaling of the traffic symbol estimates z'. More particularly, the receiver circuit 30 gains a significant increase in the number of samples available for correlation determination based on using despread traffic values rather than despread pilot values. For example, in the high data rate Modulation and Coding Schemes (MCSs) associated with HS-DSCH transmissions in W-CDMA networks, the traffic channel spreading factors are considerably lower than the pilot channel spreading factors. These low traffic channel spreading factors, such as where 16-QAM is employed, result in a larger number of traffic despread values over a given window of time.

Using one transmission slot of a three-slot TTI as an example, the receiver circuit 30 has 160 despread traffic values at its disposal, assuming a traffic channel spreading factor of 16, as compared to the 10 pilot despread values that generally are received per slot. Further, in multi-code transmission, as is often used in the higher data rate MCSs, multiple traffic channel symbols are transmitted at equal power over multiple spreading codes. As a result, the receiver circuit 30 has multiple orthogonally despread traffic values at the same symbol interval. Multi-code transmission thus multiplies the number of available data points for the estimation of the data correlation.

As one example, a W-CDMA network transmitter may assign 12 of 16 possible channelization codes to the HS-DSCH, meaning that the targeted receiver receives 12 orthogonally encoded traffic symbols during each symbol transmission interval. For an assumed traffic channel spreading factor of 16, the targeted receiver would thus receive 12×160=1920 data points per slot.

The availability of that many data points per slot enables the receiver circuit 30 to improve its data correlation processing. For example, the receiver circuit 30 may be configured to determine data correlations for multiple intervals within a given transmission slot, such that the data correlations are updated over the given transmission slot. That is, the receiver circuit 30 may be configured to calculate an updated data covariance matrix $R_{traf}$ at each of one or more intervals within a given transmission slot.

More particularly, the receiver circuit 30 may calculate $R_{traf}(i)$ for each multi-code $i \in \{1, \ldots, K\}$, for K multi-codes. Thus, the receiver circuit 30 may determine code-specific data correlations from the corresponding code-specific despread traffic values and average the code-specific data correlations together in a given interval, to obtain an averaged estimate of data correlations for that given interval. That is, the receiver circuit 30 can be configured to determine data correlations for each of one or more intervals within a defined transmission slot or window by averaging the code-specific data correlations together to obtain averaged data correlations for the interval, and further to generate traffic symbol estimates and a corresponding signal-to-noise ratio within the interval based on the averaged data correlations determined for that interval.

Figure 4:
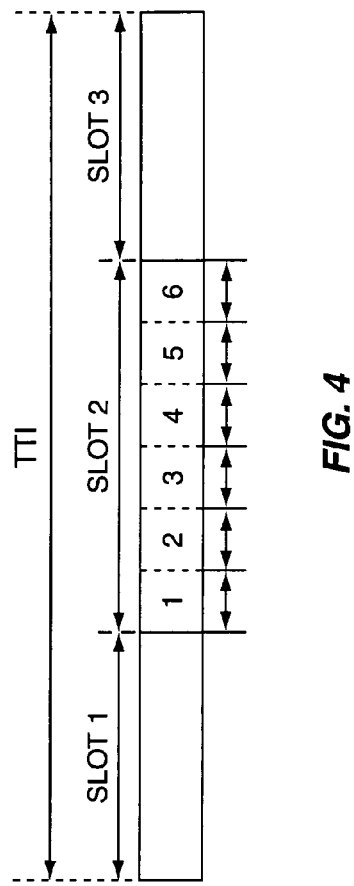
FIG. 4 is a diagram of slots and sub-slots within a W-CDMA Transmission Time Interval (TTI), representing a specific example of calculating updated data correlations at intervals within a defined time window.

In one embodiment, the receiver circuit 30 is configured to divide a transmission slot into six segments, and to use the data points in each segment to generate a "fast" G-RAKE combining weight solution. FIG. 4 illustrates this approach. For example, again assuming a spreading factor of 16 and 12 channelization codes used for multi-coding the HS-DSCH transmissions, the receiver circuit 30 has 320 data points per interval. Those skilled in the art will appreciate that having a combining weight solution more localized to a portion of the slot, rather than averaged over a whole slot, can produce better tracking of fast-fading conditions. This more localized weight solution can also have benefits in terms of the quality of the amplitude reference inherent in the weight solution methods taught herein.

Of course, those skilled in the art will appreciate that the receiver circuit 30 can be configured to determine combining weights according to a variety of methods, and that having a large number of data points available over a given slot yields significant flexibility. Thus, the combining weight solutions may be determined per-interval, for multiple intervals in a slot, such that each interval represents a localized (sub-slot) weight solution. One embodiment of this approach is described immediately above. However, other embodiments may average together the interval-specific weight solutions to obtain an averaged weight solution for all or a portion of the slot. Further, the receiver circuit 30 may be configured to calculate a combining weight solution for the whole slot thereby maximizing the number of data points used in the combining weight calculations. This approach may yield a relatively low noise solution, while still providing per-slot combining weight solutions.

In general, those skilled in the art will appreciate that the use of data correlations in accordance with the methods taught is not limited to a particular approach to generating the MMSE combining weights v, in terms of per-interval or per-slot calculations, with or without averaging. Indeed, the present invention is not limited to the foregoing features and advantages and, instead, is limited only by the following claims and their legal equivalents.

What is claimed is:

1. A method of processing a received communication signal with a wireless communication receiver comprising:
    calculating a traffic-to-pilot scaling factor by relating data correlations determined from despread traffic values obtained from the received communication signal to noise correlations determined from despread pilot values obtained from the received communication signal;
    calculating combining weights for combining the despread traffic values as a function of the traffic-to-pilot scaling factor, the data correlations, and channel estimates determined from the despread pilot values; and
    generating traffic symbol estimates by combining corresponding ones of the despread traffic values using the combining weights, such that the traffic symbol estimates represent Minimum Mean Square Error (MMSE) estimations inherently scaled in amplitude relative to symbol values in a reference modulation constellation.

2. A wireless communication device for operation in a wireless communication network, said device including a receiver circuit for processing a received communication signal, wherein said receiver circuit comprises:
    a scaling factor calculation circuit configured to calculate a traffic-to-pilot scaling factor by relating data correlations determined from despread traffic values obtained from received communication signal to noise correlations determined from despread pilot values obtained from the received communication signal;
    a combining weight calculation circuit configured to calculate combining weights for combining the despread traffic values as a function of the traffic-to-pilot scaling factor, the data correlations, and channel estimates determined from the despread pilot values; and
    a combining weight circuit configured to generate traffic symbol estimates by combining corresponding ones of the despread traffic values using the combining weights, such that the traffic symbol estimates represent Minimum Mean Square Error (MMSE) estimations inherently scaled in amplitude relative to symbol values in a reference modulation constellation.

3. A method of processing a received communication signal with a wireless communication receiver comprising:
    determining channel estimates and noise correlations from despread pilot values obtained from the received communication signal;
    determining data correlations from despread traffic values obtained from the received communication signal;
    calculating one or more traffic-to-pilot scaling factors by expressing the noise correlations as a function of the data correlations;
    generating combining weights for combining the despread traffic values as a function of the one or more traffic-to-pilot scaling factors, the data correlations, and the channel estimates;
    generating traffic symbol estimates by using the combining weights to combine corresponding ones of the despread traffic values; and
    generating first soft-valued bit estimates for each traffic symbol estimate by comparing the traffic symbol estimate to traffic symbols in a reference symbol constellation.

4. The method of claim 3, further comprising calculating a signal-to-noise ratio for the received communication signal as a function of the combining weights, the channel estimates, and one or more of the one or more traffic-to-pilot scaling factors.

5. The method of claim 4, further comprising generating second soft-valued bit estimates for each traffic symbol estimate by scaling the corresponding first soft-valued bit estimates by the signal-to-noise ratio.

6. The method of claim 4, further comprising using an attenuation factor in calculating the signal-to-noise ratio to reduce the effects of estimation noise in one or both the combining weights and the channel estimates.

7. The method of claim 4, further comprising using a bounding limit associated with one or more of the one or more scaling factors in calculating the signal-to-noise ratio to force the signal-to-noise ratio to be finite and positive.

8. The method of claim 3, wherein determining data correlations from despread traffic values obtained from the received communication signal comprises determining data correlations for multiple intervals within a given transmission slot, such that the data correlations are updated over the given transmission slot.

9. The method of claim 3, wherein the received communication signal comprises a High Speed Downlink Shared Channel (HS-DSCH) signal transmitted from a transmitter configured according to Wideband Code Division Multiple Access (W-CDMA) standards.

10. A method of processing a received communication signal with a wireless communication receiver comprising:
    determining channel estimates and noise correlations from despread pilot values obtained from the received communication signal;
    determining data correlations from despread traffic values obtained from the received communication signal;
    calculating one or more traffic-to-pilot scaling factors by expressing the noise correlations as a function of the data correlations;
    generating combining weights for combining the despread traffic values as a function of the one or more traffic-to-pilot scaling factors, the data correlations, and the channel estimates; and
    wherein the received communication signal includes a multi-coded traffic signal from which code-specific despread traffic values are obtained, and wherein determining data correlations from despread traffic values obtained from the received communication signal comprises determining code-specific data correlations from the corresponding code-specific despread traffic values and averaging the code-specific data correlations together.

11. A method of processing a received communication signal with a wireless communication receiver comprising:
determining channel estimates and noise correlations from despread pilot values obtained from the received communication signal;
determining data correlations from despread traffic values obtained from the received communication signal;
calculating one or more traffic-to-pilot scaling factors by expressing the noise correlations as a function of the data correlations;
generating combining weights for combining the despread traffic values as a function of the one or more traffic-to-pilot scaling factors, the data correlations, and the channel estimates;
wherein the received communication signal includes a multi-coded traffic signal from which code-specific despread traffic values are obtained, and wherein determining data correlations from despread traffic values obtained from the received communication signal comprises determining code-specific data correlations from the corresponding code-specific despread traffic values; and
wherein determining data correlations from despread traffic values obtained from the received communication signal further comprises, for each of one or more intervals within a defined transmission slot or window, averaging the code-specific data correlations together to obtain averaged data correlations for the interval, and further comprising generating traffic symbol estimates and a corresponding signal-to-noise ratio within the interval based on the averaged data correlations determined for that interval.

12. A receiver circuit for processing a received communication signal comprising:
one or more correlation circuits configured to determine data correlations for despread traffic values obtained from the received communication signal and noise correlations for despread pilot values obtained from the received communication signal; and
a scaling factor calculation circuit configured to calculate one or more traffic-to-pilot scaling factors by expressing the noise correlations as a function of the data correlations;
a combining weight circuit configured to calculate combining weights for combining the despread traffic values as a function of the one or more traffic-to-pilot scaling factors, the data correlations, and channel estimates determined from the despread pilot values;
wherein the one or more correlation circuits, scaling factor circuit, and combining weight circuit comprise a Generalized RAKE (G-RAKE) receiver circuit, and the G-RAKE receiver circuit further includes a channel estimation circuit configured to generate the channel estimates; and
wherein the G-RAKE receiver circuit further includes a combining circuit configured to generate traffic symbol estimates by using the combining weights to combine corresponding ones of the despread traffic values, and further comprising a demodulation circuit configured to generate first soft-valued bit estimates for each traffic symbol estimate by comparing the traffic symbol estimate to traffic symbols in a reference symbol constellation.

13. The receiver circuit of claim 12, wherein the receiver circuit further comprises a signal quality calculation circuit configured to calculate a signal-to-noise ratio for the received communication signal as a function of the combining weights, the channel estimates, and one or more of the one or more traffic-to-pilot scaling factors.

14. The receiver circuit of claim 13, wherein the signal quality calculation circuit is configured to use an attenuation factor in calculating the signal-to-noise ratio to reduce the effects of estimation noise in one or both the combining weights and the channel estimates.

15. The receiver circuit of claim 13, wherein the signal quality calculation circuit is configured to use a bounding limit associated with one or more of the one or more scaling factors in calculating the signal-to-noise ratio to force the signal-to-noise ratio to be finite and positive.

16. The receiver circuit of claim 12, wherein the demodulation circuit is configured to generate second soft-valued bit estimates for each traffic symbol estimate by scaling the corresponding first soft-valued bit estimates by the signal-to-noise ratio.

17. The receiver circuit of claim 12, wherein the receiver circuit is configured to determine data correlations for multiple intervals within a given transmission slot such that the data correlations are updated over the given transmission slot.

18. The receiver circuit of claim 12, wherein the receiver circuit comprises a Generalized RAKE (G-RAKE) receiver circuit configured for use in a wireless communication network configured according to Wideband Code Division Multiple Access (W-ODMA) standards.

19. A receiver circuit for processing a received communication signal comprising:
one or more correlation circuits configured to determine data correlations for despread traffic values obtained from the received communication signal and noise correlations for despread pilot values obtained from the received communication signal;
a scaling factor calculation circuit configured to calculate one or more traffic-to-pilot scaling factors by expressing the noise correlations as a function of the data correlations;
a combining weight circuit configured to calculate combining weights for combining the despread traffic values as a function of the one or more traffic-to-pilot scaling factors, the data correlations, and channel estimates determined from the despread pilot values; and
wherein the received communication signal includes a multi-coded traffic signal from which code-specific despread traffic values are obtained, and wherein the receiver circuit is configured to determine code-specific data correlations from the corresponding code-specific despread traffic values, and to determine the data correlations by averaging the code-specific data correlations together.

20. The receiver circuit of claim 19, wherein the receiver circuit is configured to determine the code-specific data correlations and corresponding averaged data correlations for each of one or more intervals within a defined transmission slot, and to generate traffic symbol estimates and a corresponding signal-to-noise ratio within each interval based on the averaged data correlations determined for that interval.

21. A receiver circuit configured to process a received communication signal, said receiver circuit comprising:
- a scaling factor calculation circuit configured to calculate a traffic-to-pilot scaling factor by relating data correlations determined from despread traffic values obtained from the received communication signal to noise correlations determined from despread pilot values obtained from the received communication signal;
- a combining weight calculation circuit configured to calculate combining weights for combining the despread traffic values as a function of the traffic-to-pilot scaling factor, the data correlations, and channel estimates determined from the despread pilot values; and
- a combining circuit configured to generate traffic symbol estimates by combining corresponding ones of the despread traffic values using the combining weights, such that the traffic symbol estimates represent Minimum Mean Square Error (MMSE) estimations inherently scaled in amplitude relative to symbol values in a reference modulation constellation.

* * * * *

UNITED STATES PATENT AND TRADEMARK OFFICE
CERTIFICATE OF CORRECTION

PATENT NO. : 7,609,754 B2 Page 1 of 2
APPLICATION NO. : 11/215638
DATED : October 27, 2009
INVENTOR(S) : Tracy L. Fulghum It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 586 days.

should read (*) Notice: Subject to any disclaimer, the term of this patent is extended or adjusted under 35 U.S.C. 154(b) by 1,009 days.

On the Title Page, in Item (56), under "U.S. PATENT DOCUMENTS", in Column 1, Line 13, delete "Bottomley et al." and insert -- Bottomley --, therefor.

On Page 2, in Item (56), under "OTHER PUBLICATIONS", in Column 2, Line 23, delete "Ration" and insert -- Ratio --, therefor.

On Page 2, in Item (56), under "OTHER PUBLICATIONS", in Column 2, Line 35, delete "interative" and insert -- iterative --, therefor.

In Column 2, Line 6, in Eq. 5, delete " $\sqrt{\langle |z|^2 \rangle} \leftarrow w^H h_{traf} = \mu.$ " and insert -- $\sqrt{\langle |z|^2 \rangle} \approx w^H h_{traf} = \mu.$ --, therefor.

In Column 2, Line 16, after "w" insert -- as --.

In Column 7, Line 44, delete "Eq. 1" and insert -- Eq. 16 --, therefor.

Signed and Sealed this

Eighteenth Day of May, 2010

David J. Kappos
*Director of the United States Patent and Trademark Office*

In Column 7, Line 49, delete "$s_i \epsilon D_0(j)$" and insert -- $s_l \in S_0(j)$ --, therefor.

In Column 12, Line 35, in Claim 18, delete "(W-ODMA)" and insert -- (W-CDMA) --, therefor.